US011334526B2

(12) United States Patent
Khajuria et al.

(10) Patent No.: US 11,334,526 B2
(45) Date of Patent: May 17, 2022

(54) HANDLING PREVIEWS OF REMOTELY STORED CONTENT OBJECTS

(71) Applicant: Box, Inc., Redwood City, CA (US)

(72) Inventors: Deepak Khajuria, San Jose, CA (US); Jeremy Spiegel, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 238 days.

(21) Appl. No.: 16/231,209

(22) Filed: Dec. 21, 2018

(65) Prior Publication Data

US 2020/0201818 A1   Jun. 25, 2020

(51) Int. Cl.
| | |
|---|---|
| G06F 16/00 | (2019.01) |
| G06F 16/16 | (2019.01) |
| G06F 16/957 | (2019.01) |
| G06F 16/955 | (2019.01) |
| G06F 16/176 | (2019.01) |

(52) U.S. Cl.
CPC .......... *G06F 16/168* (2019.01); *G06F 16/176* (2019.01); *G06F 16/955* (2019.01); *G06F 16/9577* (2019.01)

(58) Field of Classification Search
CPC .... G06F 16/168; G06F 16/176; G06F 16/955; G06F 16/9577
See application file for complete search history.

(56) References Cited

U.S. PATENT DOCUMENTS

| | | | |
|---|---|---|---|
| 9,063,912 B2 | 6/2015 | Seibert, Jr. et al. | |
| 9,098,474 B2 | 8/2015 | Lockhart et al. | |
| 9,213,684 B2 | 12/2015 | Lai et al. | |
| 10,742,434 B2 | 8/2020 | Press et al. | |
| 11,210,610 B2 | 12/2021 | Lockhart et al. | |
| 2007/0297029 A1* | 12/2007 | Low | G06F 40/106 358/527 |
| 2011/0107431 A1* | 5/2011 | Sukanen | G06F 21/42 726/27 |
| 2011/0202430 A1* | 8/2011 | Narayanan | G06Q 10/10 705/27.1 |

(Continued)

OTHER PUBLICATIONS

"Preview Handlers and Shell Preview Host," Microsoft, dated May 30, 2018.
"Understanding Shell Namespace," Microsoft, dated May 30, 2018.

*Primary Examiner* — Dinku W Gebresenbet
(74) *Attorney, Agent, or Firm* — Vista IP Law Group, LLP

(57) ABSTRACT

Methods, systems and computer program products for content management and collaboration systems. Embodiments address handling remotely-stored preformatted previews of remotely stored content objects for display on a user device without having to store a local copy of the remotely stored content objects to the user device. A user operates a content object viewer that is provided as part of the operating system running on the user device. As provided, the content object viewer includes a graphical user interface for accessing files of the operating system. Using the graphical user interface capabilities of the content object viewer, the user selects a particular one of the remotely stored content objects. Upon such selection, the content object viewer displays a preview of the particular one of the remotely stored content objects without having to have a local copy of the particular one of the remotely stored content objects at the user device.

22 Claims, 10 Drawing Sheets

(56) References Cited

U.S. PATENT DOCUMENTS

2013/0198600 A1     8/2013   Lockhart et al.
2017/0374130 A1*   12/2017   AbiEzzi ................ H04L 67/025
2020/0097614 A1*    3/2020   Borkar .................. G06F 16/904

* cited by examiner

HANDLING PREVIEWS OF REMOTELY STORED CONTENT OBJECTS

FIELD

This disclosure relates to content management systems, and more particularly to techniques for handling previews of remotely stored content objects.

BACKGROUND

Modern computing systems have one or more user interfaces that provide access to certain components of the systems. The most numerous and familiar of such components are the files and folders that are persistently stored at a local storage facility (e.g., comprising hard disk drives, solid state drives, etc.). Such files and/or folders are often hierarchically organized in accordance with a file system and/or namespace implemented at the computing system. Users need a way to access and manage the files and/or folders.

The operating systems of many user devices (e.g., desktops, laptops, smartphones, etc.) are equipped with content object viewers (e.g., a file finder, a file explorer, etc.) that provide a graphical user interface configured to facilitate navigation over a hierarchy of content objects (e.g., files, folders, etc.) associated with the storage devices of the user devices. To aid its users, such content object viewers support many different views. Some views present a graphical depiction of the hierarchical relationships between the content objects. Some views present a list of items in a particular folder, where each item is identified by an icon in combination with a file name such that the file type (e.g., a document, or a spreadsheet, or a 3D CAD model, etc.) is easily identifiable. Some views comprise a display area (e.g., frame, window, etc.) that is specially configured to present a preview of a selected file.

Unfortunately, in order to efficiently generate and present a preview of a file, file viewers need to have a copy of the selected file on the same machine as the file viewer. This presents many barriers to efficient generation and presentation previews of files. For example, files that are located elsewhere (e.g., at a network location) and/or files that are very large might consume a hefty amount of bandwidth and a hefty amount of storage resources to bring the file from the network location to store at the local machine. Additionally, certain types of files need an underlying application to be able to generate a preview, which application might be expensive both in terms of the computational cost of running the application to generate a preview as well as the economic cost of hosting the application at the local machine.

Therefore, what is needed is a technique or techniques that address presenting previews of remotely stored content objects in a local content object viewer—without having a local copy of the content object.

SUMMARY

The present disclosure describes techniques used in systems, methods, and in computer program products for handling previews of remotely stored content objects, which techniques advance the relevant technologies to address technological issues with legacy approaches. More specifically, the present disclosure describes techniques used in systems, methods, and in computer program products for presenting previews of remotely stored content objects in a content object viewer in a timely fashion. Certain embodiments are directed to technological solutions for intercepting preview requests from a content object viewer to deliver URLs that refer to preformatted previews of shared content objects in an embedded browser element at the content object viewer.

The disclosed embodiments modify and improve over legacy approaches. In particular, the herein-disclosed techniques provide technical solutions that address the technical problems attendant to presenting previews of remotely stored content objects in a local content object viewer in a timely fashion. Such technical solutions involve specific implementations (i.e., data organization, data communication paths, module-to-module interrelationships, etc.) that relate to the software arts for improving computer functionality.

The techniques for intercepting preview requests from a content object viewer to deliver URLs that refer to preformatted previews of shared content objects in an embedded browser element at the content object viewer overcome long-standing yet unsolved technological problems associated with presenting previews of remotely stored content objects in a local content object viewer that arise in the realm of computer systems.

Many of the herein-disclosed embodiments for intercepting preview requests from a content object viewer to deliver URLs that refer to preformatted previews of shared content objects in an embedded browser element of the content object viewer. Such are technological solutions pertaining to technological problems that arise in the hardware and software arts that underlie collaboration systems. Aspects of the present disclosure achieve performance and other improvements in peripheral technical fields including (but not limited to) human-machine interfaces and distributed storage systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
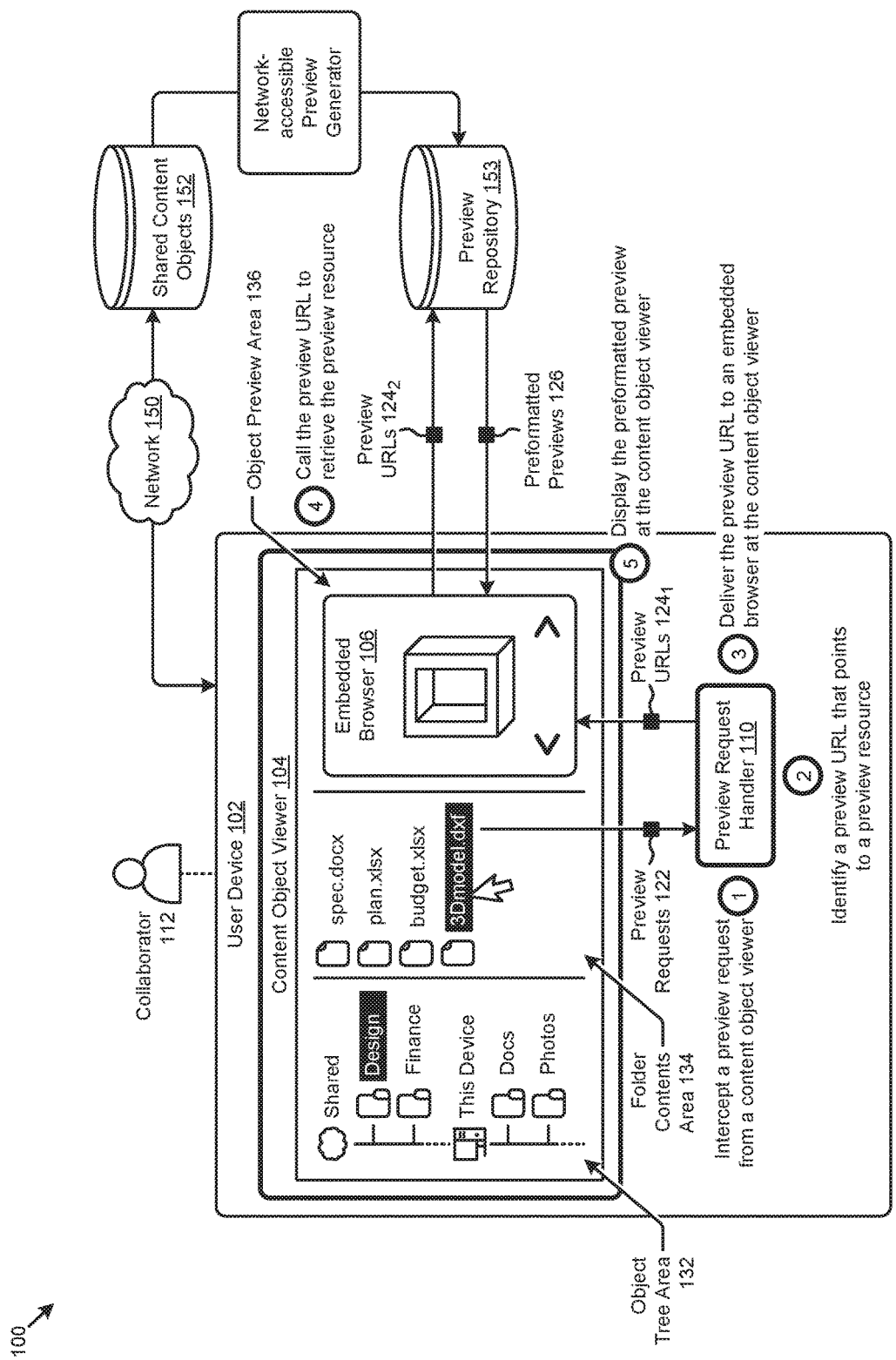
FIG. 1 illustrates a computing environment in which embodiments of the present disclosure can be implemented.

Aspects of the present disclosure solve problems associated with using computer systems for presenting previews of remotely stored content objects in a local content object viewer. These problems are unique to, and may have been created by, various computer-implemented methods for presenting previews of remotely stored content objects in a local content object viewer in the context of collaboration systems. Some embodiments are directed to approaches for intercepting preview requests from a content object viewer to deliver URLs that refer to preformatted previews of shared content objects in an embedded browser element at the content object viewer. The accompanying figures and discussions herein present example environments, systems, methods, and computer program products for presenting previews of remotely stored content objects in a content object viewer.

Overview

In today's computing environments, user devices can interact (e.g., over a network) with a collaboration system that manages very large corpora of shared content objects that are stored remotely from the user devices. For example, the employees of a large enterprise might each have one or more user devices they use to access a large corpus of content objects owned by the enterprise that is stored remotely at a collaboration system. One benefit of using such collaboration systems is the ability to accommodate the vast difference between the higher storage capacity of the cloud-based collaboration systems and the substantially lower storage capacity of the individual user devices. Whereas a collaboration system might store a very large corpora of shared content objects, a particular user device might only want to or need to store a small portion of those content objects. Still, a user may want to navigate over such remotely stored content objects at a user device. To accommodate such needs, certain techniques have been implemented to facilitate navigation over the remotely stored content objects using a local instance of a content object viewer. For example, the virtual object representation capability (e.g., for navigating to remote devices, a recycle bin, etc.) of a particular content object viewer can be used to establish a virtual folder that points to the directory structure of the remotely stored content objects.

As previously indicated, presenting previews of remotely stored content objects in a local content object viewer can introduce unwanted complexities and latencies. In some cases, the extent of the unwanted complexities and latencies becomes extreme. For example, if a user selects (e.g. "mouses over") the file name of a remotely stored instance of, for example, a 3D CAD model in a content object viewer, one or more large files would need to be downloaded to the user's device over the network before a preview of the 3D CAD model can be presented in the viewer. Sometimes, after the network and storage expense of retrieving a local copy has been incurred, and after the user has endured the latency and computational expense of generating a preview of the 3D CAD model, the user might decide that the particular 3D CAD model is not of interest—yet the entire model and the generated preview remain, consuming storage space at the local device.

Disclosed herein are techniques that facilitate presentation of previews in a file viewer without having to download the whole file to the user device and thus incur the costs of moving and storing the file.

In many cases, previews (e.g., manipulable previews, navigable previews, etc.) of remotely stored content objects are presented in a pane of a content object viewer running on the user device. The content object viewer (e.g., WINDOWS FILE EXPLORER, APPLE FINDER, etc.) is a set of software instructions that is delivered as a part of the operating system running on the user device. Such a content object viewer provides a graphical user interface for accessing files of the operating system. When a user selects a particular one of the remotely stored content objects, the content object viewer is used to display a preview of the particular one of the remotely stored content objects without having a local copy of the particular one of the remotely stored content objects at the user device.

This can be accomplished in many ways. For example, instead of using the computing facilities of the user device for downloading a local copy, and then using the downloaded local copy to generate a preview at the user device, instead, a remote repository of previews is populated with pre-generated previews that can be retrieved from the repository with considerably less expense. Moreover, it often happens that the computing infrastructure associated with the repository is populated with powerful CPUs and vast memory resources such that richer, and/or more complete, and/or faster-operating previews can be generated. As such, the disclosed techniques facilitate presentation of previews in a file viewer without needing any local execution of specific applications (e.g., specialized applications such as CAD applications) that correspond to specific file types (e.g., specialized CAD file formats).

Some embodiments use URLs and browser capabilities to be able to retrieve pre-generated previews from the remote repository. In some cases, a content object viewer intercepts preview requests from a user, and a specially-configured module is used to retrieve and deliver preview URLs that in turn facilitate presentation of preformatted previews of shared content objects in an embedded browser element at the content object viewer. In certain embodiments, a preview request handler is registered at a user device to intercept preview requests from a content object viewer that pertain to one or more shared content objects. Such shared content objects can be remotely stored (e.g., at a collaboration system) and/or locally stored (e.g., at the user device). The preview request handler is initialized to establish an embedded browser in a preview window of the content object viewer. When a user interacts with (e.g., touches, clicks once, "mouses over", etc.) a shared content object presented in the content object viewer, a preview request is issued and intercepted by the preview request handler.

The information (e.g., request attributes) delivered in the preview request is analyzed to determine a preview URL associated with the shared content object. For example, an object identifier contained in a preview request might be accessed to determine the preview URL. The preview URL is delivered to the embedded browser, which accesses the resource at the URL to retrieve a preformatted preview of the shared content object that is displayed in the embedded browser. In certain embodiments, the preview URL is generated by the preview request handler. In certain embodiments, the preview URL is stored remotely (e.g., in a lookup table at a remote location). In certain embodiments, the preformatted preview is stored remotely (e.g., at the collaboration system). In certain embodiments, the preformatted preview is stored locally (e.g., in cache memory, in persistent storage, etc.).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to intercepting preview requests from a content object viewer to deliver URLs that refer to preformatted previews of shared content objects in an embedded browser element at the content object viewer. Specifically, the figure presents a logical depiction of how the herein disclosed techniques can be implemented in a computing environment that facilitates access to instances of shared content objects by a network of user devices.

More specifically, FIG. 1 depicts a user device 102 to represent the aforementioned network of devices, and a collection of shared content objects 152 to represent the aforementioned shared content objects accessed by the network of devices. As shown in computing environment 100, a collaborator 112 interacts with user device 102 to access remotely stored instances of shared content objects 152 over network 150. Collaborator 112 often needs to navigate over such remotely stored content objects at user device 102 while merely storing a small portion of shared content objects 152 locally on user device 102 (e.g., for editing with an application). To accommodate such needs, certain techniques have been implemented to facilitate navigation over shared content objects 152 using a local instance of a content object viewer 104 at user device 102. For example, a virtual object representation capability (e.g., for navigating to remote devices, a recycle bin, etc.) of content object viewer 104 might be used to establish a virtual folder that points to the directory structure of the remotely stored content objects. Specifically, a "Shared" folder presented in an object tree area 132 of content object viewer 104 might be a virtual folder. In some cases, the virtual folder corresponds to the root of a namespace extension that is implemented to represent the shared content objects 152.

During user interactions, collaborator 112 can navigate over other folders (e.g., "Design", "Finance", etc.) associated with the "Shared" folder of shared content objects 152 using content object viewer 104. As can be observed, collaborator 112 might select the "Design" folder to view representations of the shared content objects (e.g., "spec.docx", "plan.xlsx", "budget.xlsx", and "3Dmodel.dxf") associated with that folder in a folder contents area 134 of content object viewer 104. To further facilitate efficient navigation and/or exploration over the shared content objects, collaborator 112 often desires that a preview of a particular shared content object be presented in an object preview area 136 of content object viewer 104.

As earlier mentioned, however, presenting previews of remotely stored content objects in a local content object viewer introduces unwanted complexities and latencies. The herein disclosed techniques address such issues at least in part by implementing a preview request handler 110 at user device 102. Specifically, preview request handler 110 is registered at user device 102 to intercept instances of preview requests 122 from content object viewer 104 that pertain to one or more of the shared content objects 152.

For example, a mouse click or mouseover of the "3Dmodel.dxf" filename in folder contents area 134 might invoke a preview request by content object viewer 104 that is served by preview request handler 110 (operation 1). More specifically, each time the content object viewer 104 wants a preview, it can query the preview request handler to determine if the preview request handler wants to process the preview request (e.g., provide the preview). In response to receiving such instances of preview requests 122, preview request handler 110 determines respective instances of preview URLs $124_1$ that point to corresponding previews associated with the shared content objects. In the foregoing example, the specific preview URL pertaining to file "3Dmodel.dxf" is identified by the shown preview request handler 110 (operation 2). A preview is a file that is derived from a parent file. A preview file is generally a file that is smaller than its parent object. In many situations, previews are formatted specifically for ease of transmission (e.g., over the Internet) and/or are formatted specifically for ease of presentation (e.g., formatted into a bitmap or formatted into scalable vector graphics, or formatted into navigable pages, etc.), and/or formatted for ease of rendering (e.g., onto a display screen).

In some cases, one or more of the previews are stored locally (e.g., in a cache), and can be known and/or accessed through a list or local directory. In some cases, one or more previews are generated on demand at the time the preview request is received (such as resulting from operation 1). In some cases, the preview is generated by processing that is undertaken on the user device. In some cases, the preview is generated by processing at one or more network-accessible locations, such as at or near the location where shared content objects 152 are stored.

Irrespective of where the preview is generated and/or how the preview URL is identified, the preview URL is delivered to an embedded browser 106 at content object viewer 104 (operation 3). An embedded browser 106 can be implemented, for example, as a child window of object preview area 136 (e.g., the parent window). Such an implementation of can be dynamically linked in to the parent window upon initialization of preview request handler 110. As an example, embedded browser 106 might comprise a markup language rendering component that includes an HTML renderer so as to provide the capability to view web content (e.g., HTML code, CSS code, Javascript code, JPG assets, PNG assets, SGV assets, etc.). Furthermore, embedded browser 106 can be configured to send and receive messages (e.g., HTTP messages, HTTPS messages, file system messages, etc.) associated with certain universal resource locators (URLs). As such, embedded browser 106 calls the preview URL delivered by preview request handler 110 to retrieve the preformatted preview associated with the preview URL (operation 4). As shown, embedded browser 106 calls instances of preview URLs $124_2$ that correspond to respective instances of preview URLs $124_1$, determined by preview request handler 110, to retrieve instances of preformatted previews 126 from a preview repository 153. Preview repository 153 can be stored remotely, locally (e.g., at user device), or over a combination of local and remote storage facilities. When the content (e.g., HTML code, CSS code, Javascript code, JPG assets, PNG assets, etc.) representing the preformatted preview is received, the preformatted preview is displayed by embedded browser 106 at content object viewer 104 (operation 5).

The aforementioned capabilities facilitated by the herein disclosed techniques result in improvements in computer functionality that serve to reduce the demand for computer processing power, reduce the demand for computer memory and data storage, reduce network bandwidth use, and reduce the demand for inter-component communication in computing environments. Specifically, applications of the herein disclosed techniques reduce the consumption of networking resources and storage resources when presenting previews of remotely stored content objects at user devices by eliminating the need to download the content objects to the user devices to facilitate presentation of the previews. Furthermore, the consumption of computing resources at the user devices is reduced when presenting previews of remotely stored content objects by maintaining a shared repository of preformatted previews that can be accessed by multiple user devices.

One embodiment for handling previews (e.g., at a user device) of remotely stored content objects is disclosed in further detail as follows.

Figure 2:
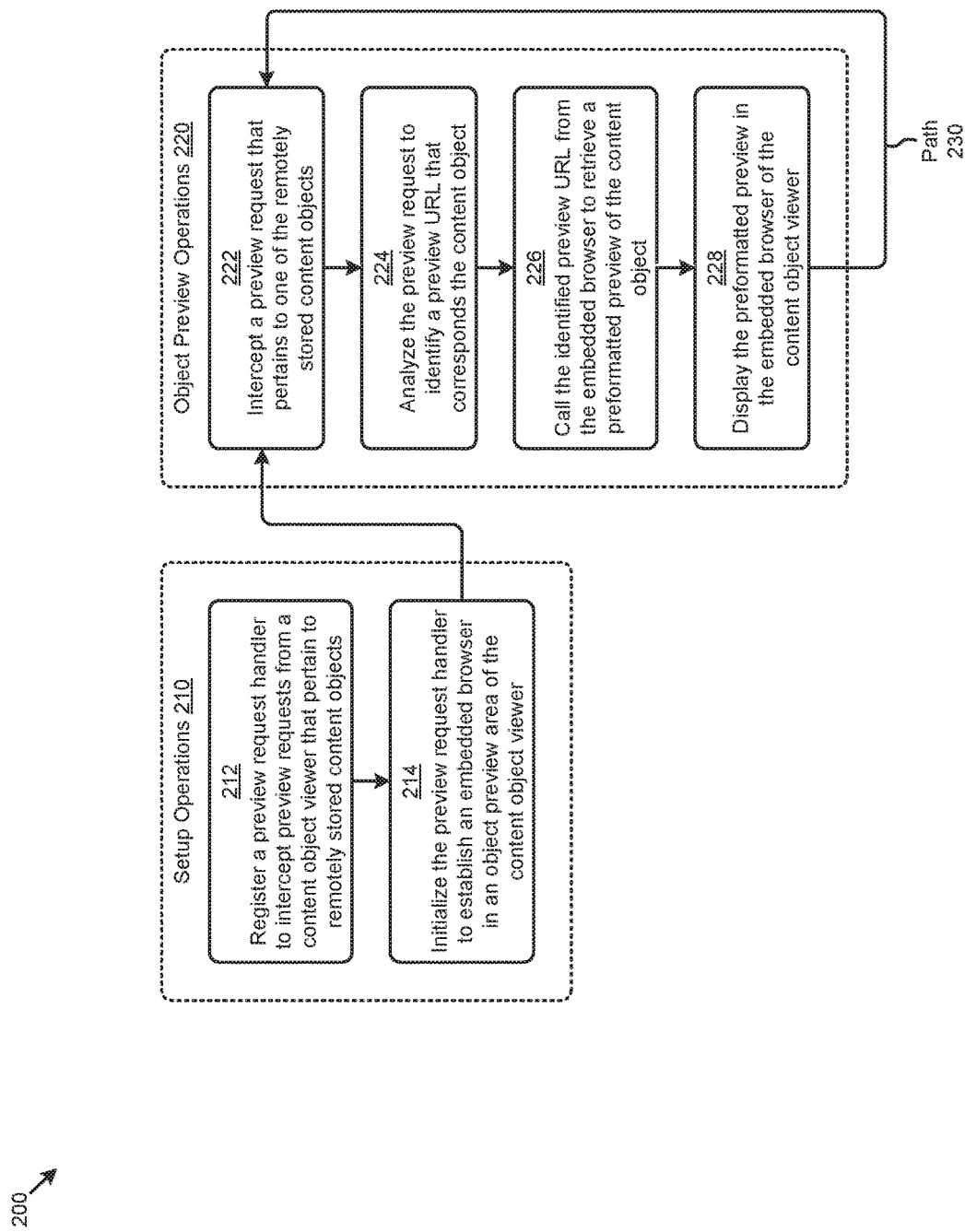
FIG. 2 depicts a shared content object previewing technique as implemented in systems that facilitate presenting previews of remotely stored content objects in a content object viewer, according to an embodiment.

FIG. 2 depicts a shared content object previewing technique 200 as implemented in systems that facilitate presenting previews of remotely stored content objects in a content object viewer. As an option, one or more variations of shared content object previewing technique 200 or any aspect thereof may be implemented in the context of the architecture and functionality of the embodiments described herein. The shared content object previewing technique 200 or any aspect thereof may be implemented in any environment.

FIG. 2 illustrates aspects pertaining to intercepting preview requests from a content object viewer to deliver URLs that refer to preformatted previews of shared content objects in an embedded browser element at the content object viewer. Specifically, the figure is presented to illustrate one embodiment of certain steps and/or operations performed over a network of devices (e.g., user devices, content management servers, etc.) to handle previews of content objects stored remotely from the devices.

As can be observed, the steps and/or operations can be grouped into a set of setup operations 210 and a set of object preview operations 220. Setup operations 210 comprise one embodiment of steps and/or operations that are implemented to facilitate certain aspects of shared content object previewing technique 200. Object preview operations 220 comprise one embodiment of steps and/or operations that are carried out (e.g., using the foregoing mechanisms) to intercept preview requests from a content object viewer to determine preview URLs that facilitate presentation of preformatted previews at the content object viewer in accordance with the herein disclosed techniques.

Setup operations 210 of shared content object previewing technique 200 commence by registering a preview request handler to intercept preview requests from a content object viewer that pertain to a collection of remotely stored content objects (step 212). As an example, a preview request handler might be registered in a Windows operating system environment as a shell extension handler that is queried by Windows Explorer when a preview event is encountered (e.g., user mouses over a content object representation). The preview request handler is initialized to establish an embedded browser in an object preview area of the content object viewer (step 214). For example, the aforementioned preview request handler implemented in a Windows environment might be initialized to create a window that comprises an embedded browser and passes the handle of the window to Windows Explorer. In this case, the window with the embedded browser can be considered a child window of the folder contents area (e.g., folder view window) of Windows Explorer.

Object preview operation 220 of shared content object previewing technique 200 commences by intercepting (e.g., at the preview request handler) a preview request that pertains to one of the remotely stored content objects (step 222). The preview request is analyzed to determine a preview URL that corresponds to the remotely stored content object (step 224). For example, various request attributes, such as an object identifier, might be extracted from the preview request by the preview request handler to determine the request URL. The preview URL is then called by the embedded browser to retrieve a preformatted preview of the remotely stored content object (step 226). As an example, the embedded browser might issue an HTTP or HTTPS "GET" call to the preview URL to retrieve a preview of the content object that is preformatted for display by the embedded browser. When the preformatted content is received by the embedded browser, the preview is displayed at the content object viewer (step 228). As depicted in path 230, the object preview operations 220 are continually performed for any and all preview requests that pertain to the remotely stored content objects.

One embodiment of a system, data flows, and data structures for implementing the shared content object previewing technique 200 and/or other herein disclosed techniques is disclosed as follows.

Figure 3:
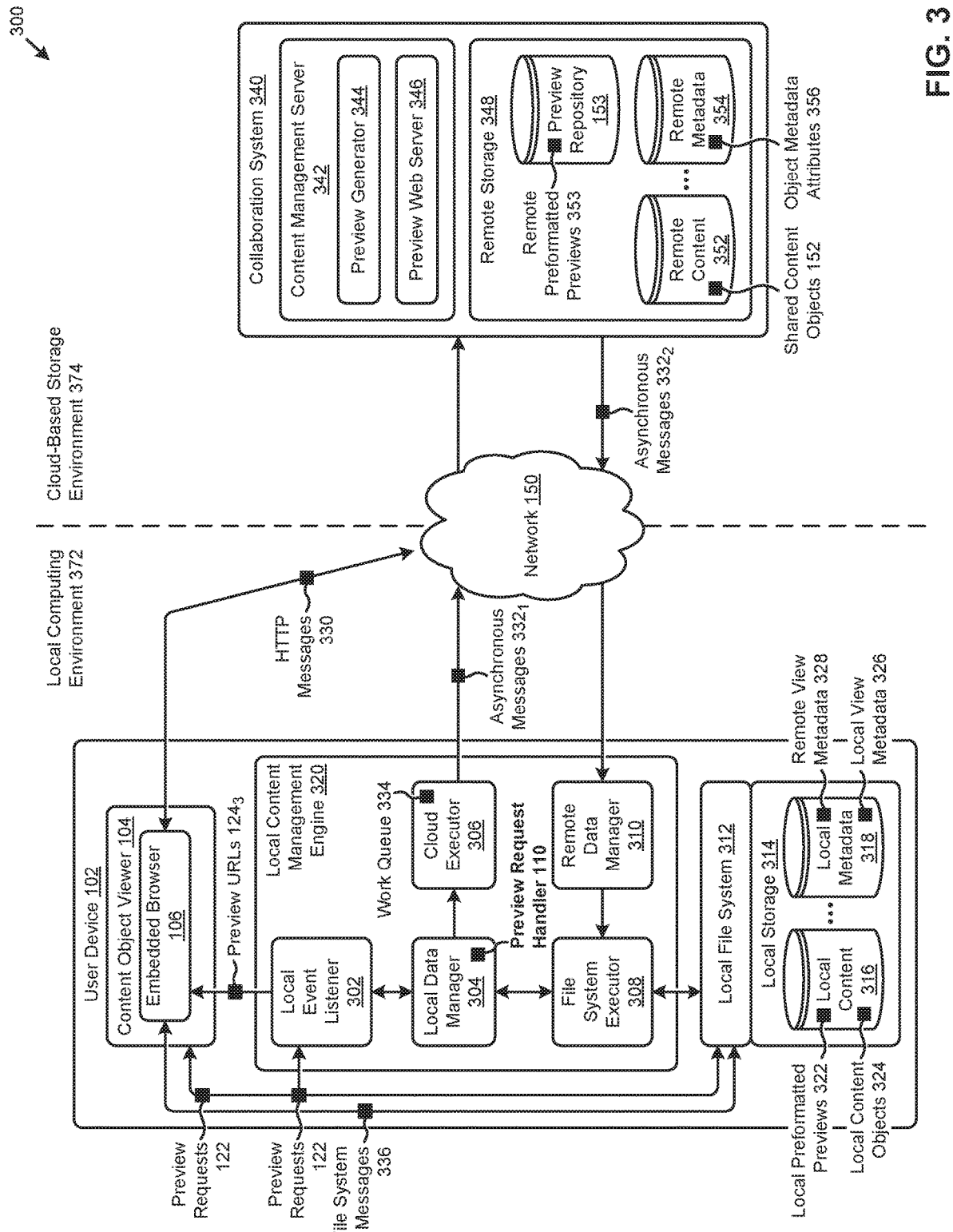
FIG. 3 is a block diagram of a system that presents previews of remotely stored content objects in a content object viewer, according to an embodiment.

FIG. 3 is a block diagram of a system 300 that presents previews of remotely stored content objects in a content object viewer. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to intercepting preview requests from a content object viewer to deliver URLs that refer to preformatted previews of shared content objects in an embedded browser element at the content object viewer. Specifically, the figure is being presented to show one embodiment of certain representative components and associated data flows that describes how the herein disclosed techniques might be implemented in a computing environment that comprises a cloud-based storage environment 374 that remotely stores a collection of shared content objects for which previews are desired at various user devices in one or more instances of a local computing environment 372. The components, data flows, and data structures shown in FIG. 3 present one partitioning and associated data manipulation approach. The specific example shown is purely exemplary, and other subsystems, data structures, and/or partitionings are reasonable.

As shown, system 300 comprises several components earlier described. Specifically shown are user device 102 comprising content object viewer 104 in local computing environment 372. Content object viewer 104 interacts with a local file system 312 to graphically present the content objects (e.g., files, folders, etc.) that constitute a set of local content 316 in local storage 314 so as to facilitate navigation over the content objects. Previews of the locally stored content objects are also presented at content object viewer 104 according to the herein disclosed techniques. User device 102 and local computing environment 372 represent a plurality of user devices and respective local computing environments that might be associated with a particular collaboration system and remote (e.g., cloud-based) storage environment. To illustrate this association, FIG. 3 depicts user device 102 interacting with a collaboration system 340 over network 150 to access the shared content objects 152 that are at or accessible through the cloud-based storage environment 374.

A local content management engine 320 is implemented at user device 102 to facilitate such interactions between user device 102 and shared content objects 152 at collaboration system 340. Specifically, local content management engine 320 is implemented at user device 102 to synchronize certain instances of local content objects 324 stored at user device 102 with respective instances of shared content objects 152 stored at collaboration system 340. Furthermore, local content management engine 320 interacts with content object viewer 104 to graphically present the content objects (e.g., files, folders, etc.) that constitute the shared content objects 152 so as to facilitate navigation over shared content objects 152 at user device 102.

In some cases, local content management engine 320 is delivered by collaboration system 340 for installation on user device 102. As shown, such installation of local content management engine 320 might allocate a certain portion of local storage 314 at user device 102 to a set of local metadata 318. Local metadata 318 can comprise sets of remote view metadata 328 and sets of local view metadata 326. As discussed in further detail herein, remote view metadata 328 represents the last-known view (e.g., before going offline) of the metadata associated with one or more remotely stored content objects, and local view metadata 326 represents the then-current view of the metadata associated with local instances of the content objects. Any of the foregoing sets of metadata in local metadata 318 might be configured to comprise internal data structures for fast access. In some cases, such internal data structures can be protected (e.g., locked).

As shown in cloud-based storage environment 374, a content management server 342 represents the various computing devices that carry out the operations of a collaboration system 340 (e.g., cloud-based shared content storage platform). Content management server 342 can access a remote storage 348 that stores a set of remote content 352, a set of remote metadata 354, and/or other data to facilitate the cloud-based storage operations. Remote content 352 comprises shared content objects 152 and/or other content objects. Remote metadata 354 comprises certain instances of object metadata attributes 356 associated with a set of remote instances of shared content objects 152 remotely stored in cloud-based storage environment 374. For example, object metadata attributes 356 might include certain attributes that characterize the location, version, access permissions, and/or other characteristics of a particular content object.

To facilitate the techniques described herein, local content management engine 320 comprises a local event listener 302 to detect events of the content object viewer 104 (e.g., events that precipitate an action by the content object viewer, and/or events that are raised by the content object viewer). As an example, local event listener 302 might detect one or more preview requests 122 from content object viewer 104, which preview requests pertain to shared content objects 152 remotely stored at collaboration system 340. Local event listener 302 interprets the detected preview requests to be dispatched to an instance of preview request handler 110 implemented in a local data manager 304 at local content management engine 320.

In response to receiving the dispatched messages, preview request handler 110 issues one or more commands and/or calls to a file system executor 308 and/or a cloud executor 306. In some cases, received messages might be placed in an event queue for later processing. File system executor 308 processes commands from preview request handler 110 that pertain to local computing environment 372, while cloud executor 306 processes commands from local data manager 304 that pertain to cloud-based storage environment 374. Specifically, file system executor 308 processes commands and/or calls associated with local file system 312 and/or local storage 314 such as a change to local metadata 318 and/or a change to local content 316. For example, preview request handler 110 might access the local metadata 318 to look up a preview URL associated with a preview request for a particular shared content object. In some cases, an object identifier and/or other information (e.g., OS type, object type, network bandwidth, etc.) extracted from a preview request might be used to look up and/or generate a preview URL. For example (but not shown for simplicity) an object identifier might be all that is needed to form a preview URL. For example, an object ID can be appended to the end of a URL, such as in "https://service.previews.com/<objID>".

In comparison, cloud executor 306 receives commands from local data manager 304 into a work queue 334 for delivery to content management server 342 over network 150. For example, a certain preview request might invoke a call by preview request handler 110 to cloud executor 306 to look up a preview URL for the request in remote metadata 354. Such operations can be carried out in response to one or more asynchronous messages $332_1$ issued from work queue 334 of cloud executor 306. Content management server 342 can receive such asynchronous messages from any and all user devices of various collaborators. Various instances of asynchronous messages $332_2$ are also issued from content management server 342 to such user devices.

The instances of asynchronous messages $332_2$ issued to user device 102 can be received by a remote data manager 310 operating at local content management engine 320. Remote data manager 310 dispatches the messages to file system executor 308 for operations (e.g., local content changes, local metadata changes, etc.) over local file system 312 or for operations associated with local data manager 304. For example, remote data manager 310 might receive a message from content management server 342 that provides a preview URL requested by preview request handlers 110.

Instances of preview URLs 1243, whether determined (e.g., looked up, generated, etc.) locally or remotely, are delivered by local content management engine 320 to embedded browser 106 at content object viewer 104. As earlier mentioned, embedded browser 106 might be established (e.g., created) upon registration of preview request handler 110 at user device 102. Embedded browser 106 issues instances of HTTP or HTTPS messages 330 over network 150 to the respective preview URLs to retrieve preformatted previews to display at content object viewer 104. As shown, a preview web server 346 receives the HTTP messages 330 and retrieves a respective instance of remote preformatted previews 353 from preview repository 153 at remote storage 348. A preview generator 344 is implemented at content management server 342 to populate the preview repository 153 with various previews associated with shared content objects 152. The previews are preformatted (e.g., HTML JSON objects) for delivery to and display by embedded browser 106.

In some cases, one or more of the remote preformatted previews 353 are stored locally as local preformatted previews 322 in local content 316 of user device 102. For example, certain previews that have been displayed once at user device 102 might be stored (e.g., in cache or persistent storage) at user device 102 in case the preview is requested again at a later time. When a preformatted preview is stored locally, the preview URL associated with the local preview is structured (e.g., "file://C:/previews/thisPreview.html") to facilitate retrieval and display of the preformatted preview in an embedded browser. Such retrieval can be carried out using file system messages 336 that are directed to the local file system 312.

An embodiment of local content management engine 320 such as is discussed as pertains to FIG. 3 is disclosed in detail as follows.

Figure 4:
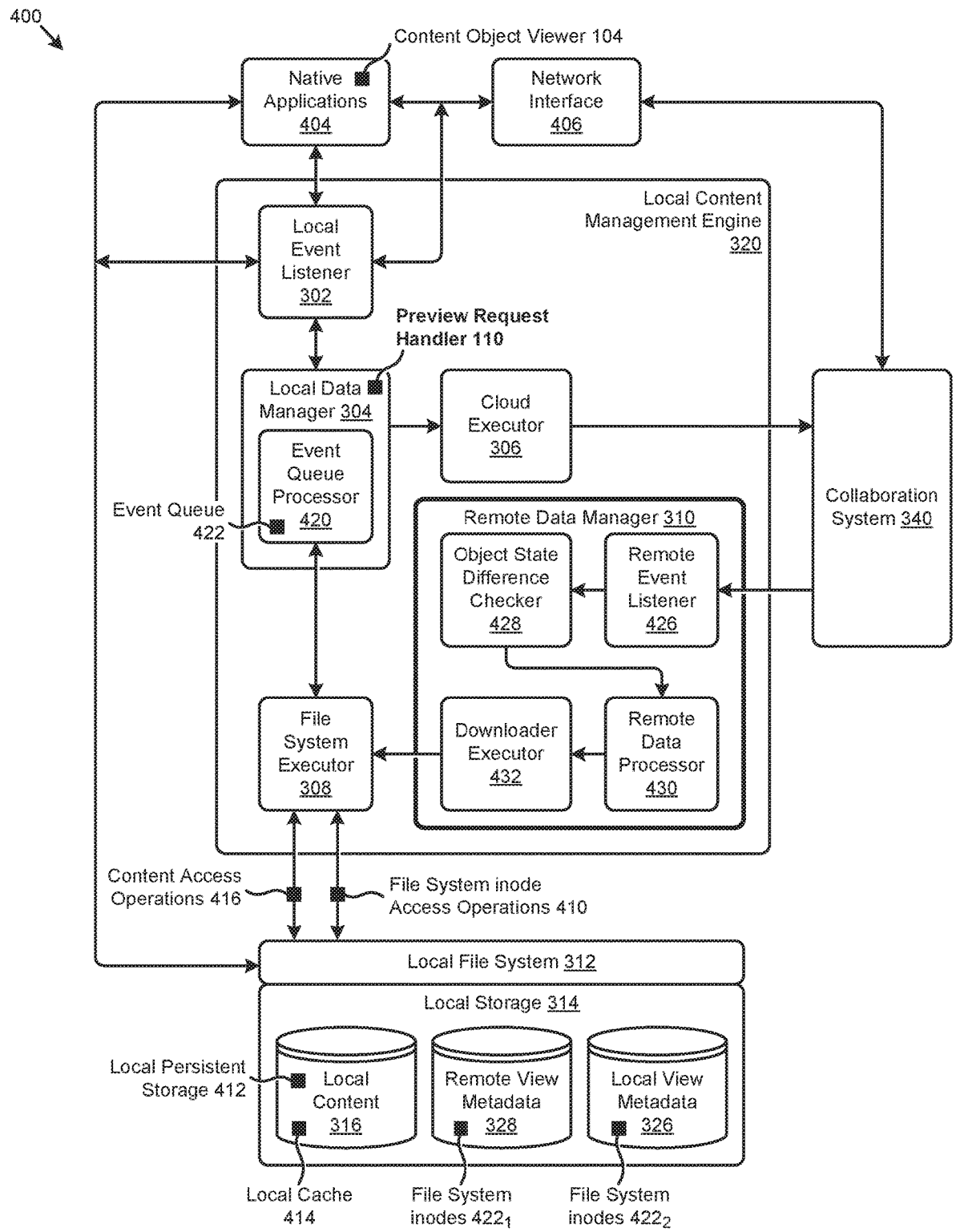
FIG. 4 is a block diagram showing a local content management engine as implemented in systems that facilitate presentation of previews of remotely stored content objects in a content object viewer, according to an embodiment.

FIG. 4 is a block diagram showing a local content management engine 400 as implemented in systems that facilitate presentation of previews of remotely stored content objects in a content object viewer. As an option, one or more variations of local content management engine 400 or any aspect thereof may be implemented in the context of the architecture and functionality of the embodiments described herein. The local content management engine 400 or any aspect thereof may be implemented in any environment.

FIG. 4 illustrates aspects pertaining to intercepting preview requests from a content object viewer to deliver URLs that refer to preformatted previews of shared content objects in an embedded browser element at the content object viewer. Specifically, the figure is being presented to show one embodiment of various representative components and associated data flows that describe how certain of the herein disclosed techniques might be implemented in a local content management engine. The components, data flows, and data structures shown in FIG. 4 present one partitioning and associated data manipulation approach. The specific example shown is purely exemplary, and other subsystems, data structures, and/or partitionings are reasonable.

As shown in the figure, an instance of local content management engine 320 is composed of a local event listener 302 that detects interactions between a set of native applications 404 and a local file system 312 and/or a network interface 406. As an example, consider a certain request issued by one of the native applications 404 (e.g., content object viewer 104) to access a file managed by local file system 312. In such a case, the request can be detected by local event listener 302 for processing by local content management engine 320. More specifically, consider a preview request from content object viewer 104 that pertains to a shared content object remotely stored at a collaboration system 340. In this case, the request can be intercepted by local event listener 302 and dispatched to a local data manager 304 to carry out various operations associated with the request. Specifically, local data manager 304 can be considered the component of local content management engine 320 that receives file access event information (e.g., file preview requests) to perform operations associated with the file access events. In the embodiment of FIG. 4, an instance of preview request handler 110 is implemented at local data manager 304 to facilitate processing of preview requests.

In some cases, local data manager 304 can manage two processing paths for certain detected events. For example, in a first path, local data manager 304 can modify and/or access locally maintained content and/or metadata in response to the event. In a second path, local data manager 304 can coordinate the performance of operations that might need to be made at collaboration system 340.

With regard to local processing, a file system executor 308 can perform any number or variations of content access operations 416 to, for example, save a copy of a modified file in a set of local content 316 in local storage 314 or access a preview URL codified in a set of local view metadata 326 in local storage 314. Certain portions of local content 316 might be persistently stored in a set of local persistent storage 412 (e.g., on a solid-state drive or hard disk drive). Other portions of local content 316 might be stored in a local cache 414. Local cache 414, for example, might comprise one or more partitions of the local memory of a local user device. As such, local cache 414 can permit faster access to recently and/or frequently accessed content objects (e.g., files) to reduce the frequency of retrieving such objects from local persistent storage 412.

In some cases, merely portions (e.g., chunks) of a content object rather than the entire content object might be stored in local cache 414 and/or other local storage facilities. This situation can arise, for example, when a collaborator is part of an enterprise that owns large volumes of shared enterprise content that the collaborator might need to access. In such cases, the user device of the collaborator might only be able to store a small portion of the shared enterprise content. As such, local content management engine 320 can facilitate delivery, to the user device of the collaborator, the local instances of the chunk or chunks of the content object that are necessary to permit local viewing and/or editing of the content object by the collaborator.

Further details regarding general approaches to chunk-based shared content object operations are described in U.S. patent application Ser. No. 15/140,179 titled "VIRTUAL FILE SYSTEM FOR CLOUD-BASED SHARED CONTENT", filed Apr. 27, 2016, which is hereby incorporated by reference in its entirety.

Certain types of content object changes may need to be reflected in the object metadata that are associated with the content objects (e.g., files). Such changes pertain to, for example, operations that delete, rename, and/or move any of the content objects in local content 316 that are managed by local content management engine 320. In such cases, various instances of file system inode access operations 410 can be performed by file system executor 308 to, for example, apply changes to certain file system nodes (e.g., inodes).

In certain embodiments, two sets of metadata can be maintained by local content management engine 320. As an example, a set of local view metadata 326 can correspond to metadata that might be changed locally without confirmation of those changes from collaboration system 340. Also, a set of remote view metadata 328 can correspond to metadata that hold the most recent snapshot of information from the point of view of collaboration system 340. Respective instances of the aforementioned file system inodes (e.g., file system inodes $422_1$ and file system inodes $422_2$) can be recorded at the two sets of metadata and managed by file system executor 308.

When any access to local content 316 is detected by local content management engine 320, remote view metadata 328 is first checked to determine the state of the relevant content objects from the perspective of collaboration system 340. Local view metadata 326 is then used to reveal the locally-understood "delta" from the perspective of collaboration system 340. In some cases, such deltas or lack of deltas can be used to ensure that any local content (e.g., content in local persistent storage 412 and/or content in local cache 414) reflects certain past actions that might have previously affected the subject content objects being accessed.

Further details regarding general approaches to caching of content in local persistent storage are described in U.S. Publication No. 2016-0321288 A1, which is hereby incorporated by reference in its entirety.

In the earlier mentioned write and rename operations, a request can be received to rename a file managed by local content management engine 320. In such cases, one or more file system inode access operations 410 can be performed by file system executor 308 to apply the requested change (e.g., rename) immediately to local view metadata 326. Such an approach allows the local user device to continue to operate based on the locally-made change even though the change might not have been made throughout the collaborative environment (e.g., at collaboration system 340, or at any other user devices that can access the subject file using a respective local instance of the local content management engine).

With regard to local file system changes, local data manager 304 can place operations pertaining to file access events into an event queue 422 to be handled by an event queue processor 420. In some situations, local data manager 304 might generate an event (e.g., "file A was renamed to file B"). This event might be broadcast or otherwise emitted through a messaging system that provides READ and WRITE access to events (e.g., in event queue 422). Such a messaging system and temporary persistence of events allows for other applications (e.g., a syncing engine, a logging tool, a UI component, etc.) to listen for file access events and then to use them to initiate file-related operations. For example, a UI component may receive a "file renamed" event and respond by raising a notification for consideration by the collaborator. Such an event might also be logged.

With regard to remote processing, local data manager 304 can also place certain file access events that involve the collaboration system 340 into event queue 422 to be handled by any instance of an event queue processor 420. The event queue processor 420 can access the event queue 422 and can, for example, schedule certain calls to commit changes pertaining to a file write and/or a file rename to collaboration system 340. In some cases, such commits and/or other operations can be implemented by calling a cloud executor 306. The calls to cloud executor 306 may invoke a remote storage application programming interface (API) call that specifies the object identifier for the file that is recognized by the collaboration system 340, and/or may invoke an API call that implements the change (e.g., rename, upload, upload version, delete, etc.).

In some embodiments within collaboration system 340, an API layer can receive the API calls from cloud executor 306 to operate on the instances of content objects and/or metadata remotely stored at collaboration system 340. For example, a mapping table (e.g., in a set of object metadata) may exist at collaboration system 340 to map object identifiers to filenames. In this case, for example, a rename operation might result in changes to the entry for the subject content object(s) in the mapping table. Such changes may further result in an entry being placed in an action log that is exposed for listening.

Specifically, at a user device, a remote event listener 426 at a remote data manager 310 can listen for remote events pertaining to the user device. For example, remote event listener 426 might listen for events pertaining to any content objects managed by local content management engine 320. Specifically, in the foregoing example, the rename operation committed at collaboration system 340 pertains to the local user device associated with local content management engine 320 such that remote event listener 426 receives the event. To facilitate the herein disclosed techniques, remote event listener 426 may also receive preview URLs requested by the local user device.

For certain received event information (e.g., content object modification event information), an object state difference checker 428 can review the event information associated with the event to determine how the event information relates to and/or differs from the local view of the subject content objects (e.g., files) corresponding to the event. In some cases, based on the type and/or extent of the differences identified by object state difference checker 428, a remote data processor 430 and/or a downloader executor 432 can execute certain data operations locally at the user device. For example, the rename operation committed at collaboration system 340 can result in a change to remote view metadata 328 to reflect certain file tree changes corresponding to the renaming of the file. With remote view metadata 328 now reflecting this change, local view metadata 326 can be modified to remove the pending status of the change. Such changes might also be reflected in content object viewer 104 and other instances of native applications 404.

In some cases, local content 316 may also be updated based on a received event. For example, if the received event pertains to a change made to a subject content object at another user device (e.g., by another collaborator), a locally stored instance of the subject content object might be invalidated in advance of being replaced by an updated version. As another example, a received event at a given user device, which event pertains to a detected content object change, might not require an update to, and/or an invalidation of, a locally stored instance of the content object.

The foregoing discussions include aspects of operations at and/or between components of a computing system that facilitate implementations of the herein disclosed techniques. Such operations can be performed in many environments and/or carried out to accommodate many use models and/or scenarios, some of which are disclosed in further detail as follows.

Figure 5A:
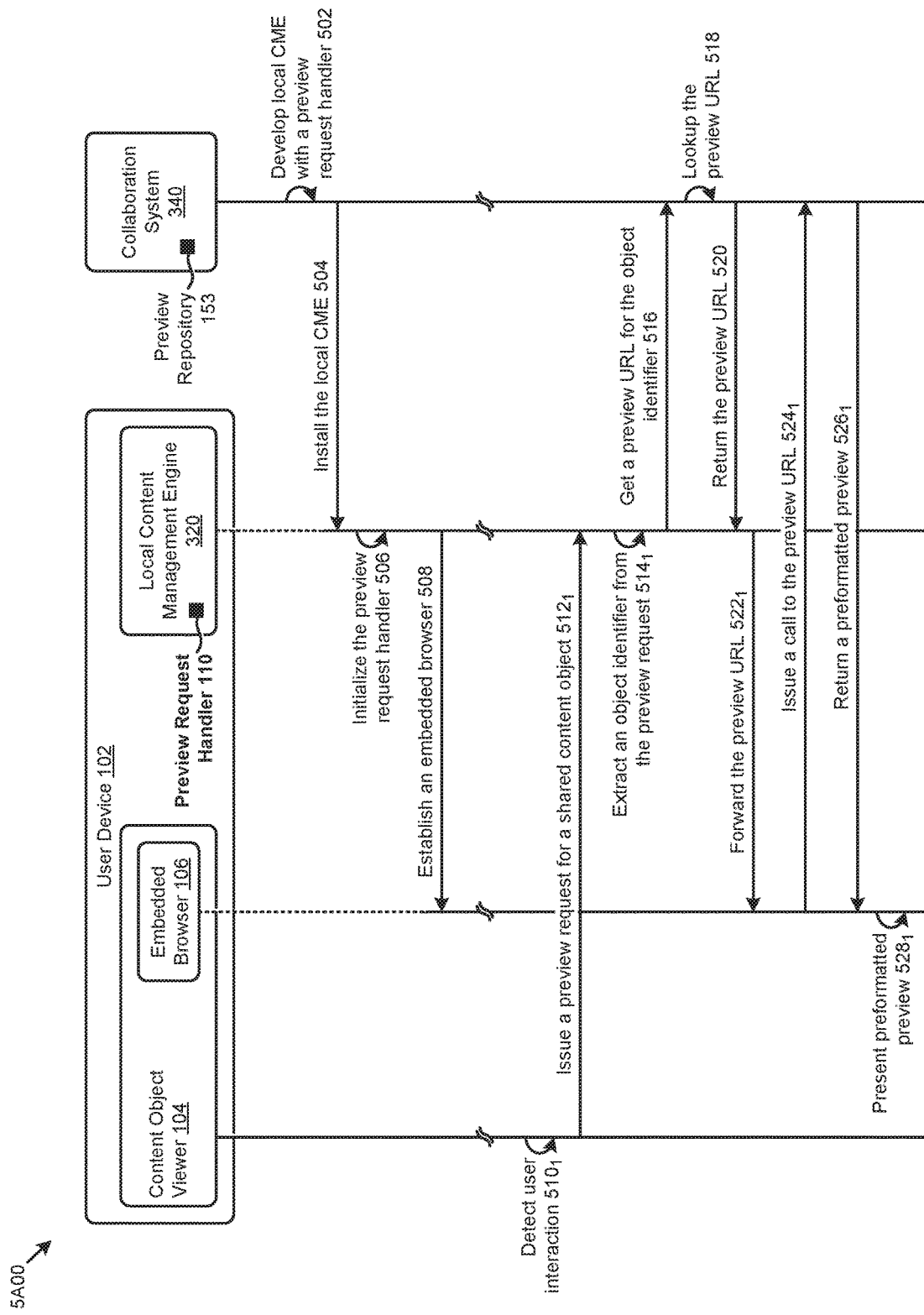
FIG. 5A is a diagram depicting a remote preview storage scenario as performed in systems that present previews of remotely stored content objects in a content object viewer, according to an embodiment.

FIG. 5A is a diagram depicting a remote preview storage scenario 5A00 as performed in systems that present previews of remotely stored content objects in a content object viewer. As an option, one or more variations of remote preview storage scenario 5A00 or any aspect thereof may be implemented in the context of the architecture and functionality of the embodiments described herein. The remote preview storage scenario 5A00 or any aspect thereof may be implemented in any environment.

FIG. 5A illustrates aspects pertaining to intercepting preview requests from a content object viewer to deliver URLs that refer to preformatted previews of shared content objects in an embedded browser element at the content object viewer. Specifically, the figure is being presented to illustrate a representative content object preview scenario facilitated by the herein disclosed techniques in which the preview URL and the preformatted preview are stored remotely from the user device displaying the preview. The high order interactions (e.g., operations, messages, etc.) of the scenario are performed by various computing components earlier described. The particular computing components shown in FIG. 5A are content object viewer 104 and local content management engine 320 associated with user device 102, and collaboration system 340. As shown, content object viewer 104 comprises embedded browser 106 and local content management engine 320 comprises preview request handler 110.

Remote preview storage scenario 5A00 commences by running executable code that constitutes a local content management engine (CME) having a preview request handler. Such executable code might be developed at collaboration system 340 (operation 502). The local CME is installed at user device 102 (message 504). For example, responsive to a request for the local CME from user device 102, an instance of the executable code of the local CME is configured (e.g., for the particular operating system of user device 102) and delivered to user device 102. More specifically, a collaborator associated with user device 102 might access a browser to request a download of the local CME. Upon installation of the local CME (e.g., local content management engine 320) at user device 102, the preview request handler is initialized (operation 506). Such initialization serves to establish an embedded browser (e.g., embedded browser 106) at content object viewer 104 (message 508). In some cases, a new instance of embedded browser 106 is created when a preview is rendered. As such, there can be multiple embedded browsers running concurrently, each embedded browser associated with a particular instance of a preview. Acts of creating a new browser can be initiated at any time that a URL for a preview is received.

At some moment in time after initialization of preview request handler 110 and establishment of embedded browser 106, a user interaction with content object viewer 104 is detected (operation $510_1$). For example, the user interaction might correspond to a user (e.g., collaborator) performing a selection operation over the file name of a shared content object that is remotely stored at collaboration system 340. In response to the detected user interaction, a preview request for the shared content object is issued by content object viewer 104 and intercepted by preview request handler 110 (message $512_1$). The object identifier for the shared content object and/or other request attributes are extracted from the preview request (operation $514_1$) and used to get a preview URL (message 516). As can be observed, the preview URL is requested by issuing a message from preview request handler 110 of local content management engine 320 to collaboration system 340. Collaboration system 340 performs a lookup of the preview URL from, for example, a preview URL lookup table (operation 518) and returns the preview URL to preview request handler 110 (operation 520).

Preview request handler 110 forwards the preview URL to embedded browser 106 (message $522_1$). Embedded browser 106 issues a call to the preview URL (message $524_1$) to retrieve a preformatted preview associated with the shared content object corresponding to the detected user interaction (message $526_1$). For example, a preview web service at collaboration system 340 might receive the call from embedded browser 106 and return a particular preformatted preview from preview repository 153 at collaboration system 340 to embedded browser 106. When the content (e.g., HTML code, CSS code, Javascript code, JPG assets, PNG assets, etc.) representing the preformatted preview is received, the preformatted preview is displayed by embedded browser 106 at content object viewer 104 (operation $528_1$).

The foregoing scenario illustrates a situation where the preview URL and the preformatted preview are stored remotely (e.g., at collaboration system 340) from the device (e.g., user device 102) displaying the preview. In some cases, one or both of the preview URL and/or the preformatted preview might be stored at the device displaying the preview. This scenario is discussed in more detail as follows.

Figure 5B:
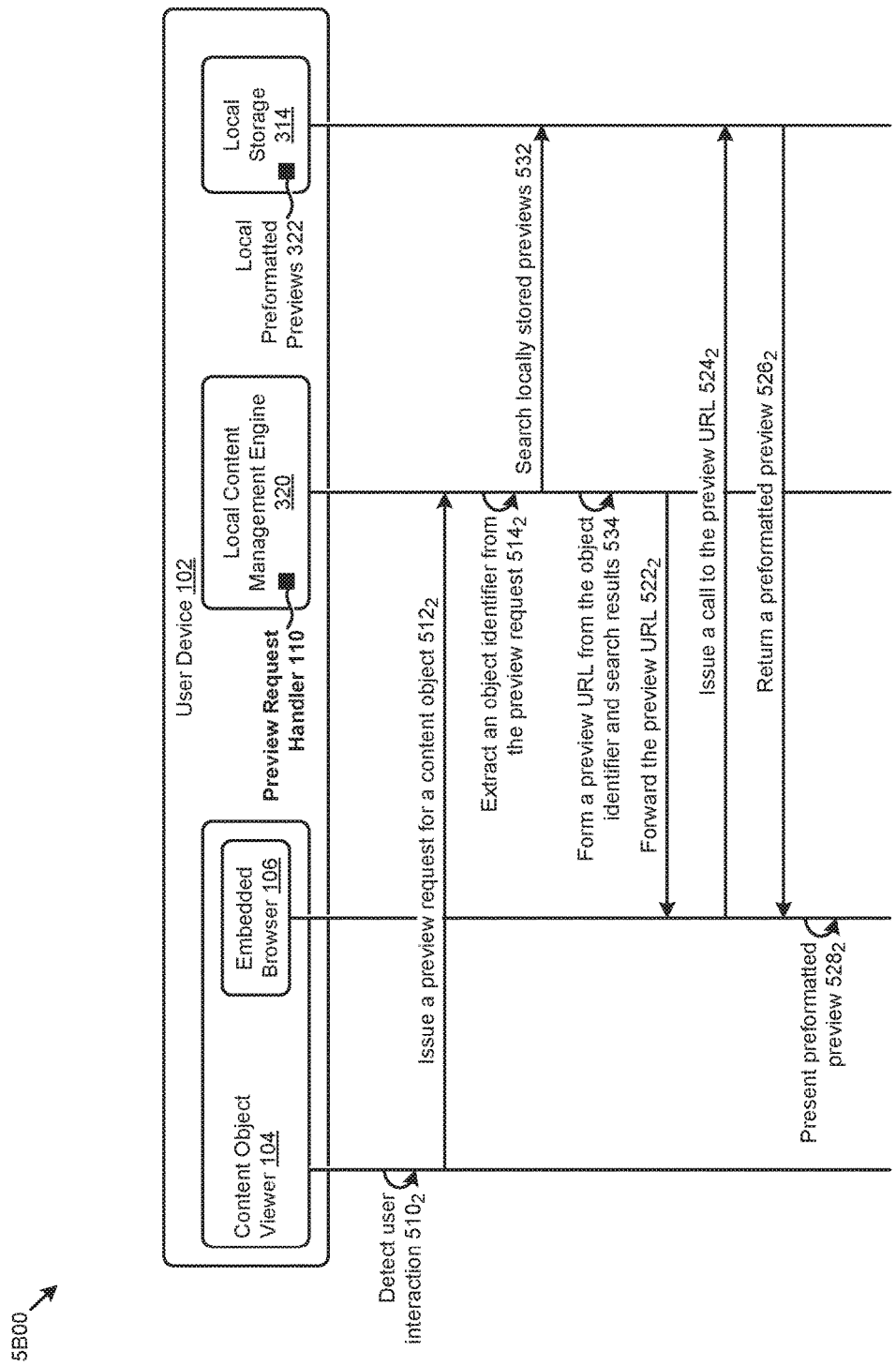
FIG. 5B is an interaction diagram depicting a local preview storage scenario as performed in systems that present previews of remotely stored content objects in a content object viewer, according to an embodiment.

FIG. 5B is an interaction diagram depicting a local preview storage scenario 5B00 as performed in systems that present previews of remotely stored content objects in a content object viewer. As an option, one or more variations of local preview storage scenario 5B00 or any aspect thereof may be implemented in the context of the architecture and functionality of the embodiments described herein. The local preview storage scenario 5B00 or any aspect thereof may be implemented in any environment.

FIG. 5B illustrates aspects pertaining to intercepting preview requests from a content object viewer to deliver URLs that refer to preformatted previews of shared content objects in an embedded browser element at the content object viewer. Specifically, the figure is being presented to illustrate a representative content object preview scenario facilitated by the herein disclosed techniques in which the preview URL and the preformatted preview are stored locally at the user device displaying the preview. The high order interactions (e.g., operations, messages, etc.) of the scenario are performed by various computing components earlier described. The particular computing components shown in FIG. 5B are content object viewer 104, local content management engine 320, and local storage 314 associated with user device 102. As further shown, content object viewer 104 comprises embedded browser 106, and local content management engine 320 comprises preview request handler 110.

At some moment in time after initialization of preview request handler 110 and establishment of embedded browser 106, a user interaction with content object viewer 104 is detected (operation 510$_2$). For example, the user interaction might correspond to a user (e.g., collaborator) clicking on a graphical representation of a shared content object that is remotely stored (e.g., at a collaboration system) and/or locally stored at user device 102. In response to the detected user interaction, a preview request for the shared content object is issued by content object viewer 104 and intercepted by preview request handler 110 (message 512$_2$). The object identifier for the shared content object and/or other request attributes are extracted from the preview request by preview request handler 110 (operation 514$_2$). Preview request handler 110 also searches a set of local preformatted previews 322 at local storage 314 to determine if the preview associated with the shared content object is stored locally (message 532).

A preview URL is formed based on the object identifier and the results of searching the locally stored previews (operation 534). For example, if the search results indicate that no previews for the shared content object are stored locally, preview request handler 110 might form a preview URL from the object identifier (e.g., stored in an "objID" field) that has the structure "https://service.previews.com/<objID>". If the search results indicate that a preview for the shared content object is stored locally and is identified by "thisPreview.pdf", preview request handler 110 might form a preview URL from the object identifier that has the structure "file://C:/previews/thisPreview.html". Local preview storage scenario 5B00 illustrates the latter case where the preview is stored locally. In this case, the preview URL is forwarded to embedded browser 106 (message 5222) and embedded browser 106 issues a call to the preview URL (message 5242) to retrieve a preformatted preview from local storage 314 (message 5262). When the content (e.g., HTML code, CSS code, Javascript code, JPG assets, PNG assets, etc.) representing the preformatted preview is received, the preformatted preview is displayed by embedded browser 106 at content object viewer 104 (operation 5282).

ADDITIONAL EMBODIMENTS OF THE DISCLOSURE

Additional Practical Application Examples

Figure 6A:
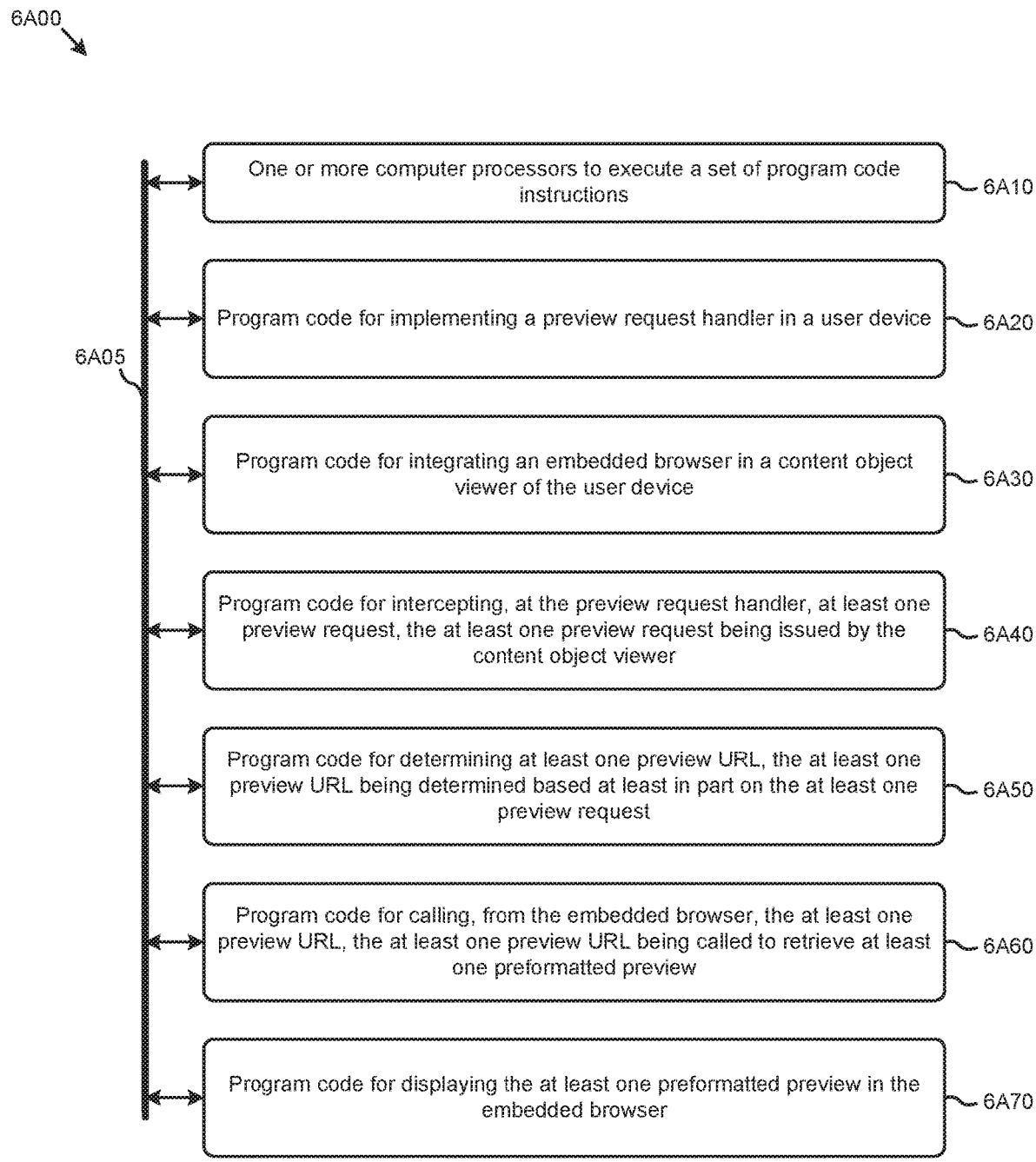
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually or as combined, serve to form improved technological processes that address presenting previews of remotely stored content objects in a local content object viewer. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment.

The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with any other operations over communication path 6A05. The modules of the system can, individually or in combination, perform method operations within system 6A00. Any operations performed within system 6A00 may be performed in any order unless as may be specified in the claims.

The shown embodiment implements a portion of a computer system, presented as system 6A00, comprising one or more computer processors to execute a set of program code instructions (module 6A10) and modules for accessing memory to hold program code instructions to perform: implementing a preview request handler in a user device (module 6A20); integrating an embedded browser in a content object viewer of the user device (module 6A30); intercepting, at the preview request handler, at least one preview request, the at least one preview request being issued by the content object viewer (module 6A40); determining at least one preview URL, the at least one preview URL being determined based at least in part on the at least one preview request (module 6A50); calling, from the embedded browser, the at least one preview URL, the at least one preview URL being called to retrieve at least one preformatted preview (module 6A60); and displaying the at least one preformatted preview in the embedded browser (module 6A70).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 6B:
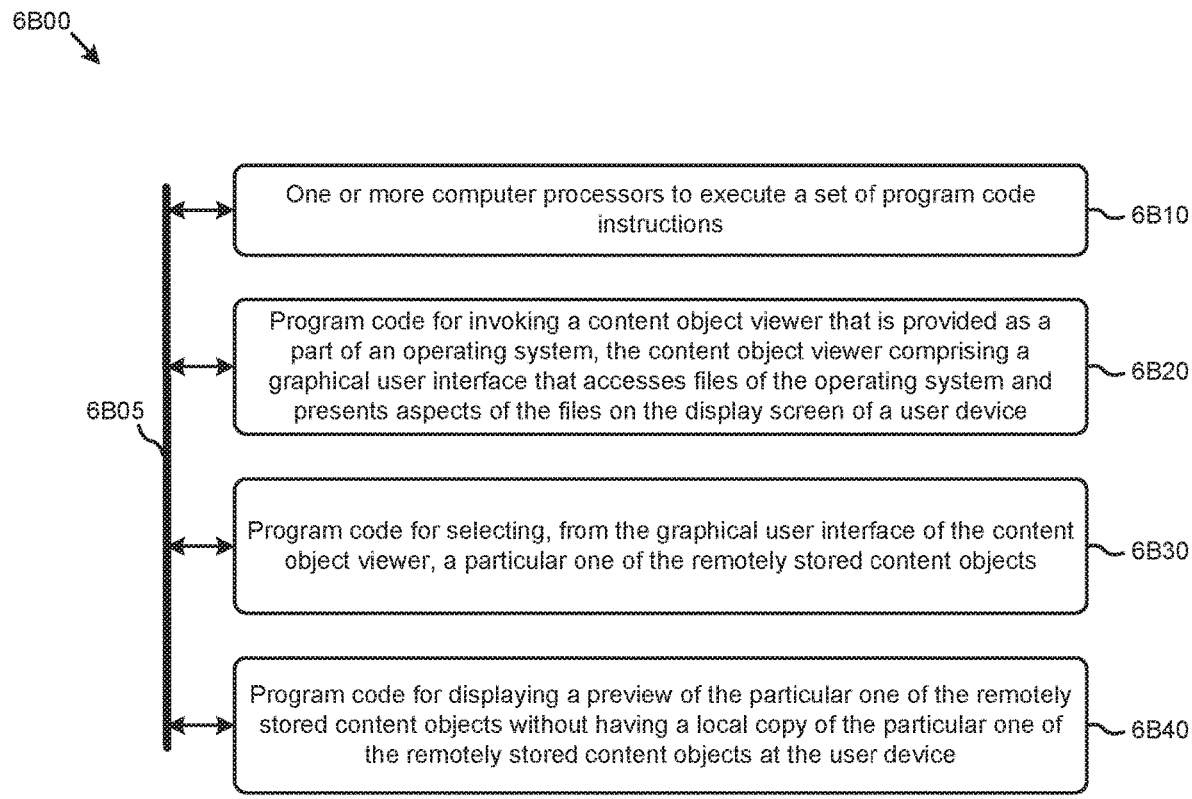

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment.

The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with any other operations over communication path 6B05. The modules of the system can, individually or in combination, perform method operations within system 6B00. Any operations performed within system 6B00 may be performed in any order unless as may be specified in the claims.

The shown embodiment implements a portion of a computer system, presented as system 6B00, comprising one or more computer processors to execute a set of program code instructions (module 6B10) and modules for accessing memory to hold program code instructions to perform: invoking a content object viewer that is provided as a part of an operating system, the content object viewer comprising a graphical user interface that accesses files of the operating system and presents aspects of the files on the display screen of a user device (module 6B20); selecting, from the graphical user interface of the content object viewer, a particular one of the remotely stored content objects (module 6B30); and displaying a preview of the particular one of the remotely stored content objects without having a local copy of the particular one of the remotely stored content objects at the user device (module 6B40).

System Architecture Overview

Additional System Architecture Examples

Figure 7A:
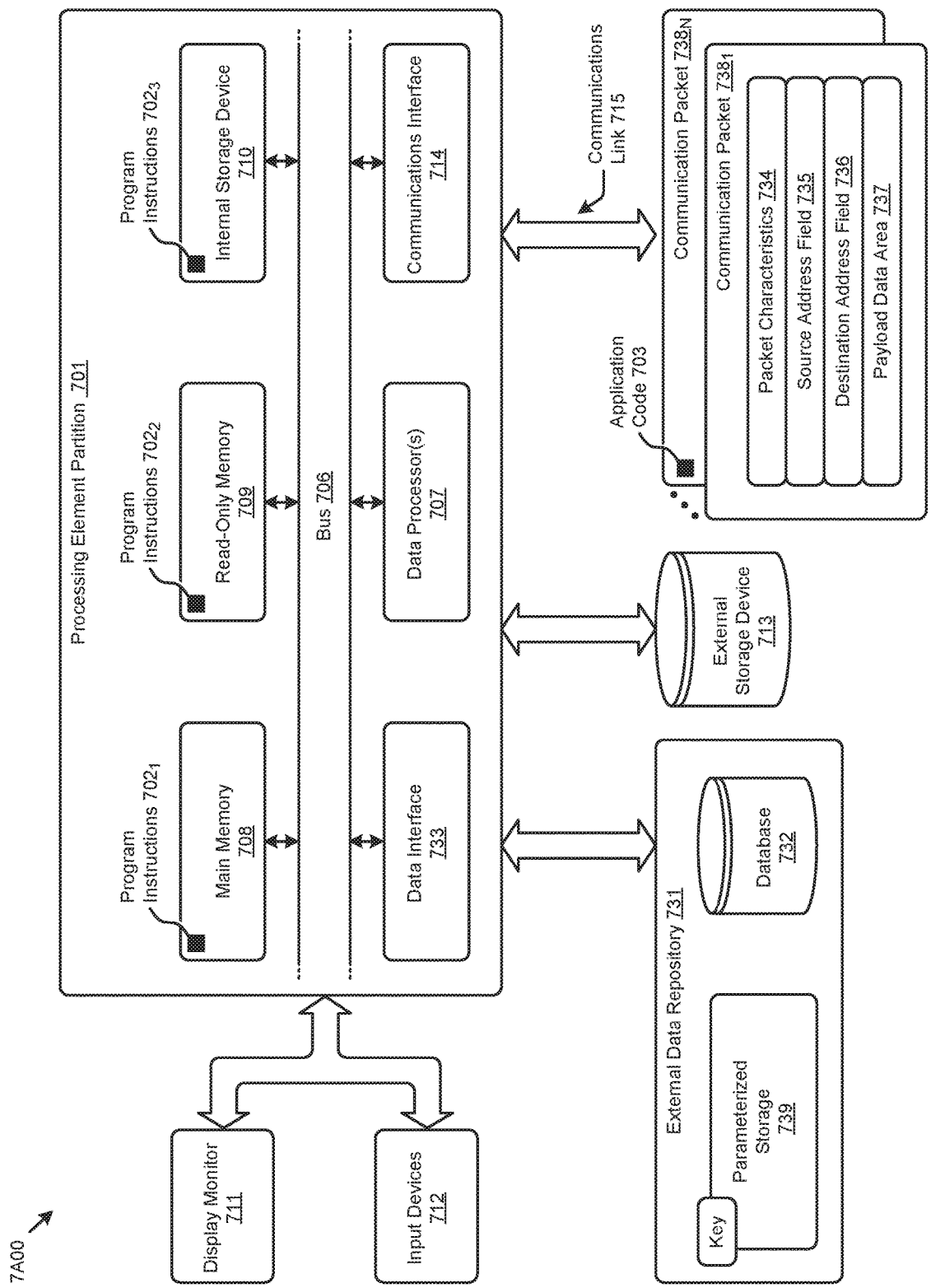
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to presenting previews of remotely stored content objects in a content object viewer. A module may include one or more state machines and/or combinational logic used to implement or facilitate the operational and/or performance characteristics pertaining to presenting previews of remotely stored content objects in a content object viewer.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of presenting previews of remotely stored content objects in a content object viewer). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to presenting previews of remotely stored content objects in a content object viewer, and/or for improving the way data is manipulated when performing computerized operations pertaining to intercepting preview requests from a content object viewer to deliver URLs that refer to preformatted previews of shared content objects in an embedded browser element at the content object viewer.

Figure 7B:
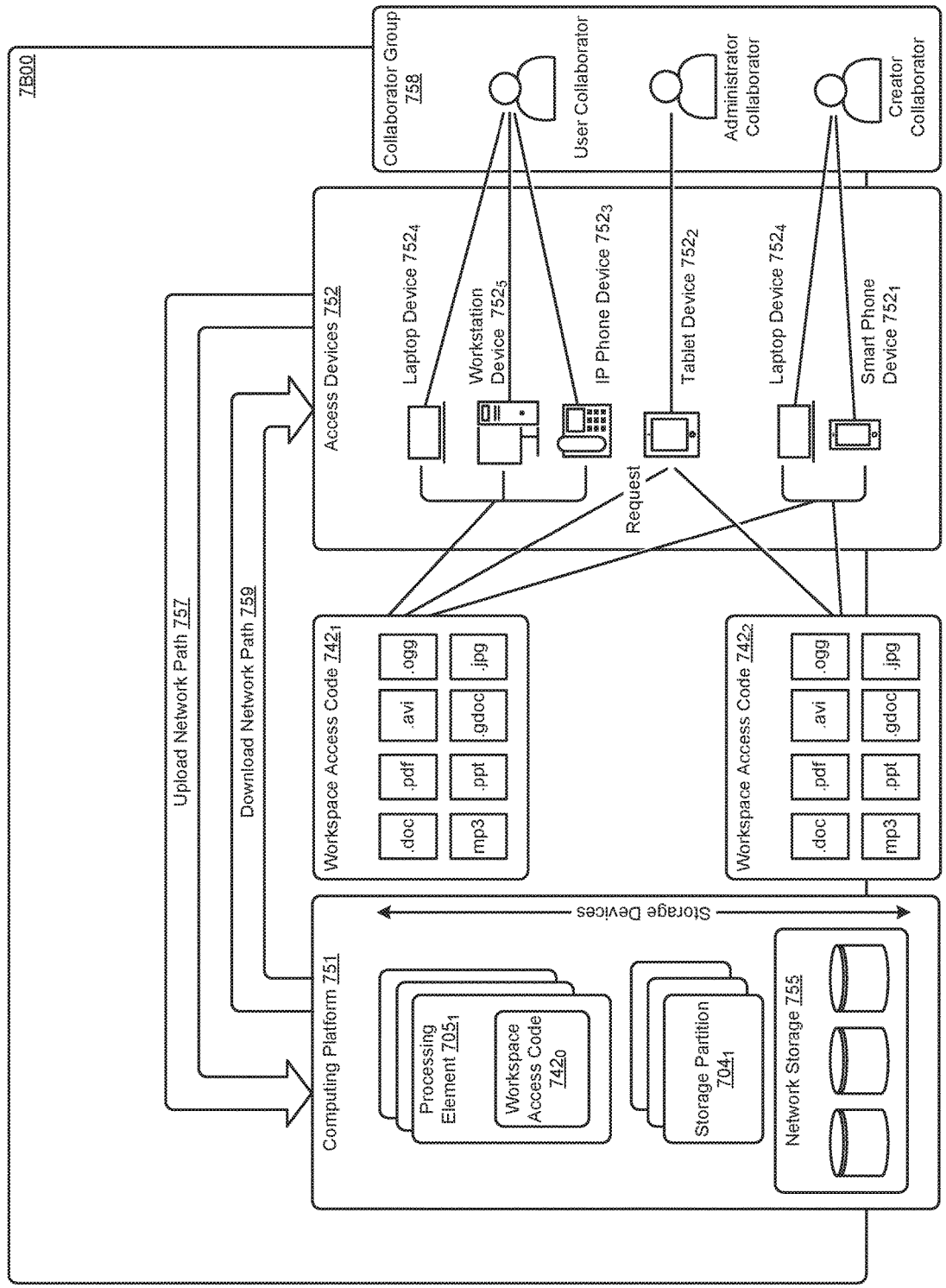

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.), and can be configured to access any type of object. Strictly as examples, such objects can be folders or directories or can be files of any filetype. A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for handling previews of remotely stored content objects, the method comprising:
    identifying an embedded browser integrated within a content object viewer on a user device;
    intercepting a preview request issued outside of the embedded browser by the content object viewer of the user device;
    determining a preview URL based at least in part on one or more aspects of the preview request;
    retrieving, by the embedded browser within the content object viewer, a preview using at least the preview URL, wherein the preview was stored in a remote collaboration system; and
    displaying the preview in the embedded browser.

2. The method of claim 1, wherein the preview request corresponds to at least one shared content object and is represented in the content object viewer, and the preview is retrieved for display in the embedded browser without requiring local execution of applications that correspond to a type of a shared content object for which the preview is retrieved for display.

3. The method of claim 2, wherein the at least one shared content object is remotely stored at the remote collaboration system.

4. The method of claim 3, wherein the preview is generated at the remote collaboration system after receipt of the preview request from the user device.

5. The method of claim 1, wherein the preview is locally stored at the user device, and the preview is retrieved for display in the embedded browser without requiring local execution of applications that correspond to a type of a shared content object for which the preview is retrieved for display.

6. The method of claim 1, wherein the preview URL is determined based at least in part on one or more request attributes associated with the preview request.

7. The method of claim 6, wherein the one or more request attributes comprise an object identifier of a content object that is shared among multiple users on the remote collaboration system.

8. The method of claim 1, wherein the preview request is invoked by at least one user interaction performed at the content object viewer on the user device.

9. The method of claim 8, wherein the at least one user interaction performed at the content object viewer comprises a mouse click or a touch in a user interface by a user of the user device.

10. The method of claim 1, wherein the embedded browser is configured to interface with a preview request handler.

11. A non-transitory computer readable medium having stored thereon a sequence of instructions which, when stored in memory and executed by one or more processors causes the one or more processors to perform a set of acts for handling previews of remotely stored content objects, the set of acts comprising:
    Identifying an embedded browser integrated within a content object viewer on a user device;
    Intercepting a preview request issued outside of the embedded browser by the content object viewer of the user device;
    determining a preview URL based at least in part on one or more aspects of the preview request;
    retrieving by the embedded browser within the content object viewer, a preview using at least the preview URL, wherein the preview was stored in a remote collaboration system; and
    displaying the preview in the embedded browser.

12. The non-transitory computer readable medium of claim 11, wherein the preview request corresponds to at least one shared content object and is represented in the content object viewer, and the preview is retrieved for display in the embedded browser without requiring local execution of applications that correspond to a type of a shared content object for which the preview is retrieved for display.

13. The non-transitory computer readable medium of claim 12, wherein the at least one shared content object is remotely stored at the remote collaboration system.

14. The non-transitory computer readable medium of claim 13, wherein the preview is generated at the remote collaboration system after receipt of the preview request.

15. The non-transitory computer readable medium of claim 11, wherein the preview is locally stored at the user device, and the preview is retrieved for display in the embedded browser without requiring local execution of applications that correspond to a type of a shared content object for which the preview is retrieved for display.

16. A system for handling previews of remotely stored content objects, the system comprising:
    a non-transitory storage medium having stored thereon a sequence of instructions; and
    one or more processors that execute the sequence of instructions, wherein execution of the sequence of instructions by the one or more processors causes the one or more processors to perform a set of acts, the set of acts comprising,
    identifying an embedded browser integrated within a content object viewer on a user device;
    intercepting a preview request issued outside of the embedded browser by the content object viewer of the user device;
    determining a preview URL based at least in part on one or more aspects of the preview request;
    retrieving, by the embedded browser within the content object viewer, a preview using at least the preview URL, wherein the preview was stored in a remote collaboration system; and
    displaying the preview in the embedded browser.

17. The system of claim 16, wherein the preview request corresponds to at least one shared content object and is represented in the content object viewer, and the preview is retrieved for display in the embedded browser without requiring local execution of applications that correspond to a type of a shared content object for which the preview is retrieved for display.

18. The system of claim 16, wherein at least one shared content object is remotely stored at the remote collaboration system.

19. The system of claim 18, wherein the preview is generated at the remote collaboration system after receipt of the preview request.

20. The system of claim 16, wherein the preview is locally stored at the user device, and the preview is retrieved for display in the embedded browser without requiring local execution of applications that correspond to a type of a shared content object for which the preview is retrieved for display.

21. A method for presenting previews of remotely stored content objects on a display screen of a user device, the method comprising:
    identifying an embedded browser integrated within a content object viewer that is provided as a part of an operating system of a user device, the content object viewer comprising a graphical user interface that accesses files of the operating system and presents one or more aspects of the files on the display screen of the user device;
    selecting, from the graphical user interface outside of the embedded browser, a particular content object of the remotely stored content objects; and
    displaying a preview of the particular content object of the remotely stored content objects in the embedded browser at least by retrieving the preview from a remote collaboration system, without having a local copy of the particular content object of the remotely stored content objects at the user device.

22. The method of claim 21, wherein the preview of the particular content object of the remotely stored content objects is generated by the remote collaboration system.

* * * * *